(12) United States Patent
Kaiser

(10) Patent No.: US 6,741,959 B1
(45) Date of Patent: May 25, 2004

(54) SYSTEM AND METHOD TO RETRIEVING INFORMATION WITH NATURAL LANGUAGE QUERIES

(75) Inventor: Matthias Kaiser, Mountain View, CA (US)

(73) Assignee: SAP Aktiengesellschaft (DE)

( * ) Notice: Subject to any disclaimer, the term of this patent is extended or adjusted under 35 U.S.C. 154(b) by 188 days.

(21) Appl. No.: 09/869,579
(22) PCT Filed: Oct. 24, 2000
(86) PCT No.: PCT/EP00/10454
§ 371 (c)(1),
(2), (4) Date: Jun. 29, 2001
(87) PCT Pub. No.: WO01/33414
PCT Pub. Date: May 10, 2001

(30) Foreign Application Priority Data

Nov. 2, 1999 (DE) .......................................... 199 52 769

(51) Int. Cl.⁷ .......................... G06F 17/30; G06F 17/28
(52) U.S. Cl. ....................... 704/7; 704/9; 707/3; 707/4; 707/5
(58) Field of Search ............................... 707/7, 6, 5, 3, 707/2, 1; 706/11; 704/9, 256, 231

(56) References Cited

U.S. PATENT DOCUMENTS

| | | | |
|---|---|---|---|
| 5,239,617 A | | 8/1993 | Gardner et al. |
| 5,255,386 A | | 10/1993 | Prager |
| 5,325,298 A | * | 6/1994 | Gallant ........................... 704/9 |
| 5,675,819 A | * | 10/1997 | Schuetze ..................... 704/10 |
| 5,778,357 A | | 7/1998 | Kolton et al. |
| 5,873,056 A | | 2/1999 | Liddy et al. |
| 5,963,940 A | | 10/1999 | Liddy et al. |
| 6,236,768 B1 | * | 5/2001 | Rhodes et al. .............. 382/306 |
| 6,341,282 B1 | * | 1/2002 | Sharpe et al. .................. 707/3 |

FOREIGN PATENT DOCUMENTS

| | | |
|---|---|---|
| DE | 690 22 842 T2 | 5/1996 |
| EP | 0 441 089 B1 | 8/1991 |
| EP | 0 522 591 A2 | 1/1993 |
| WO | WO 97/08604 | 3/1997 |

OTHER PUBLICATIONS

Lennon et al., "An evaluation of some conflation algorithms for information retrieval," 1981 Journal of Information Science, vol. 3. pp. 117–183.*
Russell et al., "Artificial Intelligence: A Modern Approach," 1995, Prentice Hall, pp. 111–115.*
Buckley et al., "New Retrieval Approaches Using SMART: TREC 4," 1996, published in the Fourth Text Retrieval Conference (TREC–4), pp. 1–3.*
Hull, "Stemming Algorithms: A Case Study for Detailed Evaluation," Jan. 1996, Journal of the American Society for Information Science, pp. 70–84.*
Lee et al., "Document Ranking and the Vector–space Model," Mar./Apr. 1997, IEEE Software, pp. 67–75.*

* cited by examiner

*Primary Examiner*—Richemond Dorvil
*Assistant Examiner*—V. Paul Harper
(74) *Attorney, Agent, or Firm*—Finnegan, Henderson, Farabow, Garrett & Dunner, LLP

(57) ABSTRACT

A search machine finds and ranks documents in a database based on a set of rules that match characteristics of the database with a natural language query. The system includes a lexicon component which may parse the query and the database into words and word stems. Thereafter, the query and documents may be vectorized such that the elements of the vector correspond to a given word stem, and the value of the element in the vector corresponds to the number of occurrences of the word in the document. The vectorized query is then compared and evaluated against each of the vectorized documents of the database to obtain a ranked list of documents from the database. The user may evaluate the documents found and provide information back to the search machine in order to adjust, for example, the ranking produced by the search machine. In this way, the search machine can fine tune its search and ranking technique to meet the user's specific criteria.

23 Claims, 4 Drawing Sheets

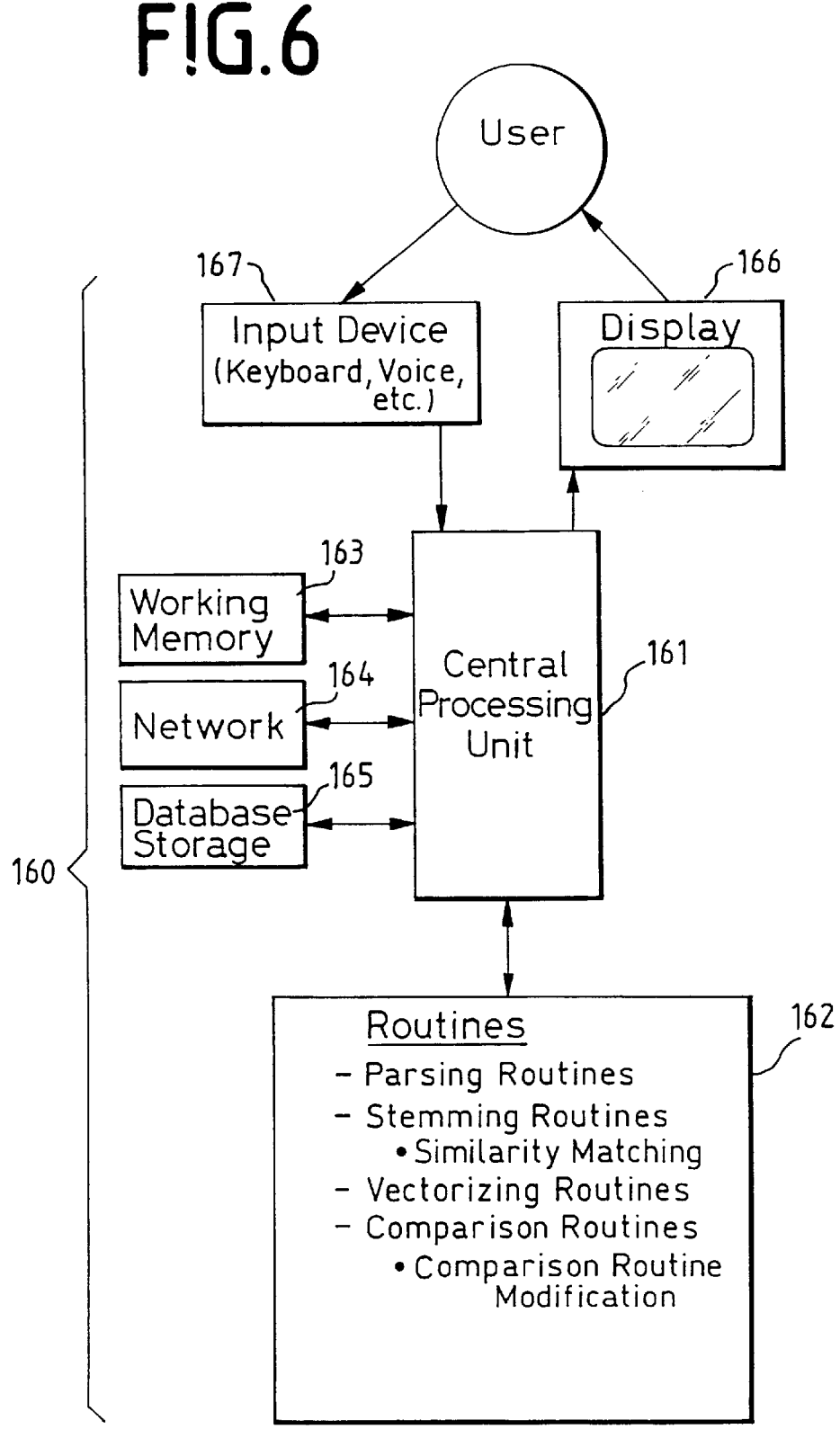

US 6,741,959 B1

SYSTEM AND METHOD TO RETRIEVING INFORMATION WITH NATURAL LANGUAGE QUERIES

FIELD OF THE INVENTION

The present invention relates to the field of information retrieval based on user input and more particularly to a system and method of retrieving, evaluating, and ranking data from a data set based upon a natural language query from the user.

BACKGROUND OF THE INVENTION

Search engines are known in the art and are used for retrieving information from databases based on user supplied input. However, for large information systems, current search tools fail to provide adequate solutions to the more complex problems which users often face. For example, many known search engines restrict users to providing key search terms which may be connected by logical connectors such as "and,"0 "or," and "not." This is often inadequate for complex user problems which are best expressed in a natural language domain. Using only keywords or boolean operations often results in a failure of the search engine to recognize the proper context of the search. This may lead to the retrieval of a large amount of information from the database that is often not very closely related to the user problem. Because known search engines do not sufficiently process the complexity of user input, it is often the case that it is very difficult with current online help facilities to obtain relevant helpful documentation for a given complex problem.

Another problem with current technologies used in document retrieval is that the user may find certain documents retrieved in a search more valuable than others, however, the user is not able to explicitly express a criteria of importance. It is often difficult in dealing with complex contexts to specify a relevance criteria exactly and explicitly.

OBJECTS AND SUMMARY OF THE INVENTION

It is an object of the present invention to provide a search machine employing a generic or non-context specific approach for a tool that is capable of searching for information contained in documents of a database on the basis of a problem specification entirely stated in natural language.

It is a further object of the present invention to provide a search machine that is not restricted to a specific environment, such as database retrieval, but may also be used in various contexts, such as, for example, context-sensitive online help in complex working and information environments, retrieval of relevant information in tutor and advisory systems, decision support for the organization of information databases, and information agents which search to build up, organize and maintain new information databases.

A further object of the present invention is to provide a search machine that can locate the most relevant parts of text within a document. Thus, the search machine may present the most relevant part of the document to the user, or provide necessary information to indicate to the user which part of the document is the most relevant.

It is a further object of the present invention to provide a search machine that attaches significance values to words or word stems of a database and a query and uses the significance values to compare the query to the database.

Yet another object of the present invention is to provide a search machine that uses data relating to the frequency of occurrence of words or word stems in a document to determine a documents relevance to a query.

In the present invention, a search machine is provided that can accept a query that may be stated in the form of natural language. The search machine can reduce the natural language query into a vector of word stems and also can reduce the documents to be searched into vectors of word stems, where a word stem is a word or part of a word from which various forms of a word are derived. The search machine may analyze the vectors of word stems determining such factors as the frequency with which word stems occur in the query and database documents, the significance of the word stems appearing in the documents, and other comparison information between the query vector and the database document vectors, in order to determine the suitability of a database document to serve as a solution to the query.

The search machine according to the present invention for retrieving information from a database based on a query of a user may include a lexicon generator for deriving a lexicon database of word stems from the documents of the database and from the query. It may further include an evaluation component that includes a document vectorizer for creating representation vectors for the documents of the database and a query representation vector for the query using the lexicon database. The document representation vectors contain data on the word stems located in the database and the query representation vector contains data on the word stems located in the query. The evaluation component may further include a vector rule base, and a vector evaluator. The vector evaluator may derive a relevance value for a document representation vector relative to the query representation vector according to the vector rule base and output information from the database that relates to the query. The search machine may also include a fine-tuner for modifying the vector rule base. The user can provide external feedback about the information retrieved from the database, and the fine tuner may use that feedback to modify the vector rule base.

The present invention is also directed to a method of retrieving documents from a database corresponding to a query that includes the steps of (i) deriving a lexical database of word stems from the documents of the database and the query, (ii) creating a representation vector corresponding to each document of the database and a query representation vector corresponding to the query, each representation vector containing information about the word stems of the lexical database that are contained in the document to which the representation vector corresponds, the query representation vector containing information about the word stems that are contained in the query document, (iii) evaluating each representation vector relative to the query representation vector using vector evaluation rules, for example, evaluating the similarity of the elements contained in vectors, (iv) creating output reflecting the evaluation of the representation vectors; and (v) presenting the output.

BRIEF DESCRIPTION OF THE DRAWINGS

FIG. 6 shows a computer system implementation of an embodiment of the present invention.

DETAILED DESCRIPTION OF PREFERRED EMBODIMENTS

Figure 1:
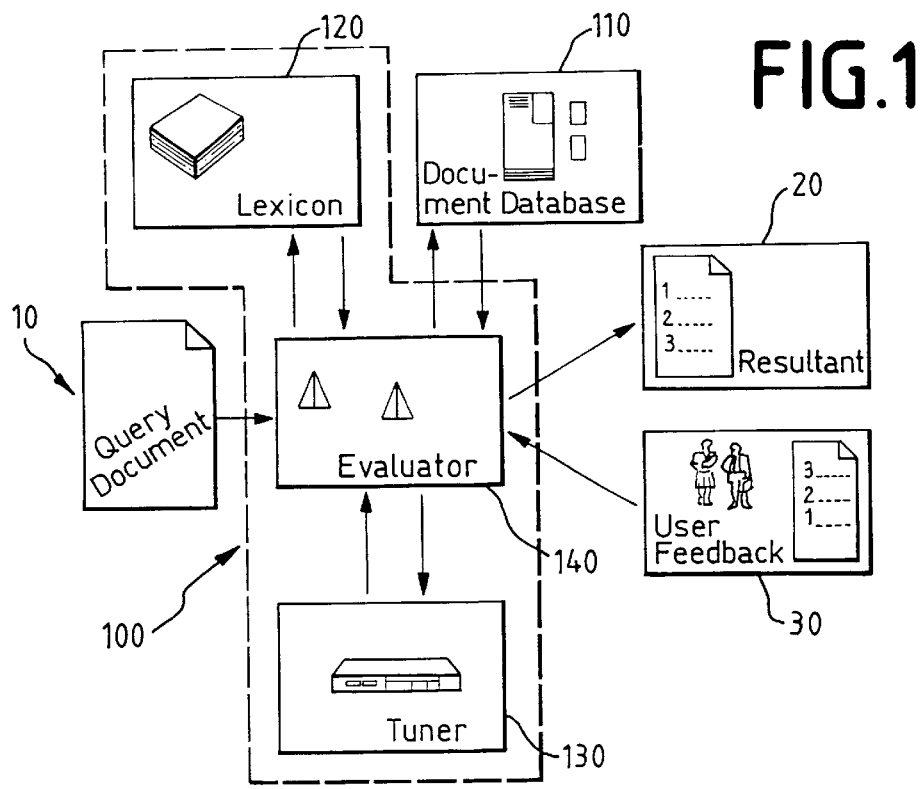
FIG. 1 shows an overview of the search machine.

The search machine of the present invention, designated generally by reference numeral 100, is shown in FIG. 1. The search machine 100 accepts a query 10 (also referred to as a query document 10) as input from the user. The query 10 may contain a natural language specification of complex user problems. The search machine 100 uses the contents of the query 10 to find relevant documents or document parts from the database 110. Documents 111 refer generally to any document or documents in the database 110. The search machine 100 includes a means for evaluating documents such as evaluation component 140 which compares the documents 111 with the query 10 and produces a resultant 20. The resultant 20 may be, for example, a list of documents from the database 110 ranked according to the documents' relevance to the query document 10. Alternatively, the resultant 20 could be, by further example, a list of a subset of the documents 111, the text of the documents 111 that relates to the search criteria, parts of the documents that match the search criteria, or information relating to search statistics, such as the number of occurrences of words in a searched document 111 that match words in the query document 10, or other forms of search results as are known to those of skill in the art.

As shown in FIG. 1, the search machine according to one embodiment of the present invention may also provide a fine tuner 130. A fine tuner 130 allows the user to provide feedback 30 to the search machine 100. The fine tuner 130 uses the user feedback 30 to alter the evaluation component 140 in order to affect the resultant 20 of the search. Fine tuner 130 is discussed in greater detail below.

The database 110 may be, for example, a collection of documents in natural language or other forms of data. For example, the information in the database could be in the form of text such as notes, comments on objects such as media in a media archive, employee information, information in logistic databases such as material resources, catalogs for purchasing or Internet shopping, or other forms of information.

While discussion of the preferred embodiment may refer to documents of the database 110, the search machine 100 may operate on databases that are not strictly in the form of documents. More generally, the term document does not connote any particular structure, but is used to generically refer to any partition, subdivision, component, section, or part of the database, however it may be divided or demarcated. Additionally, the database 110, and documents 111 that may be contained in the database 110, are not required to have any special structure or organization. The search machine 100, however, could exploit a special structure or organization of the database 110 by integrating, for example, appropriate structure analyzers to improve the search machine's accuracy and efficiency.

Additionally, the search machine according to the present invention is not restricted to a specific environment, such as database retrieval, but may also be used in various contexts, such as context-sensitive online help in complex working and information environments, retrieval of relevant information in tutor and advisory systems, decision support for the organization of information databases, and information agents which search to build up, organize and maintain new information databases.

The document database 110 should contain the documents 111 that are to be evaluated for content responsive to the query document 10. The database 110 may be a predetermined set of documents, or may be a dynamically determined set of documents. For example, the search machine 100 may permit a refined or refocused search, in which the database 110 could be the output of an earlier search.

Figure 2:
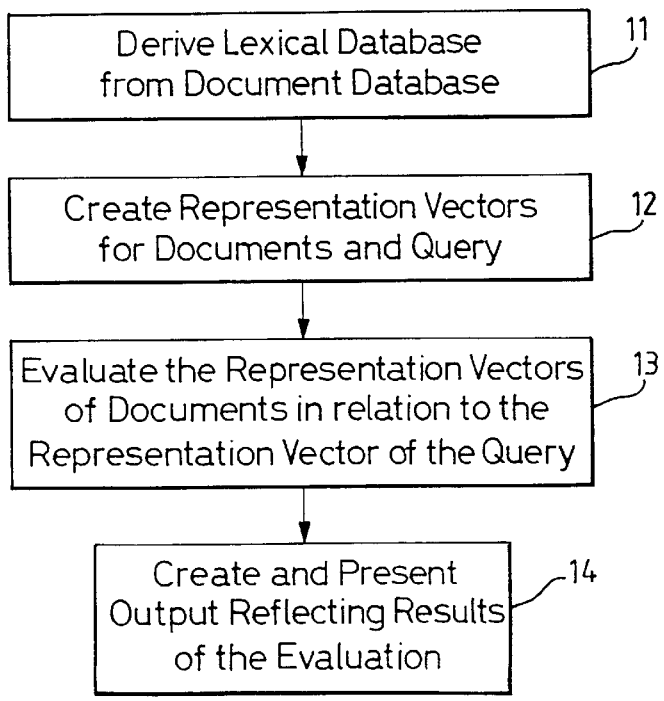
FIG. 2 shows a flow chart of a method of searching a database according to the present invention.

FIG. 2 is a flow chart showing steps according to one embodiment of the invention that may be used to evaluate documents 111 for relevance to the query 10. First, as shown in box 11, a lexical database 122 (see FIG. 3) is derived from the documents 111. The lexical database 122 is a collection of word stems 126 derived from the documents 111 and the query 10. A word stem is the word or part of a word from which various forms of a word are derived. For example, the words "recognize" and "recognizable" could be reduced to the word stem "recogniz." The words "detachable" and "detached" could be reduced to the word stem "detach." Determination of word stems will be discussed in more detail with reference to FIG. 3.

Derivation of the lexical database 122 may be done before presenting the search machine 100 to a user for querying, if a known database 110 will be used. However, if the database 110 to be searched will be derived by user selection from a large environment, such as documents retrieved from the Internet or from some other source that is not precisely defined or that may be modified, updated, or expanded, it may not be possible to process the documents 111 of the database 110 to create the lexical database 122 before presenting the search machine 100 to the user.

The documents 111 are parsed and stemmed to create a lexical database 122 using a means for generating a lexical database, such as the lexicon generator 121. The lexical database 122 may be used to create representation vectors of the documents 111 and the query 10, as indicated by box 12. A representation vector stores the word stems 126 contained in a document. As represented by box 13, the vector evaluator compares or evaluates the representation vectors of the documents 111 of the document database 110 in relation to the representation vector of the query 10 as will be discussed further below.

As indicated in box 14, after evaluating the representation vectors, the evaluator may rank the documents 111 of the document database 110 and present the results to the user. The output or resultant 20 of the search may be a ranked results list specifying documents 111 in order of their relevance to the search criteria of the query 10. An alternative includes presentation to the user of the relevant parts of the documents 111.

It is within the spirit and scope of the invention to perform the steps above in a different order to achieve the results. For example, it may be appropriate to create the representation vectors of the documents 111 in concert with the parsing and stemming operation. This may provide a more efficient algorithm than is possible if all documents are parsed and stemmed first, followed by creation of the representation vectors.

Figure 3:
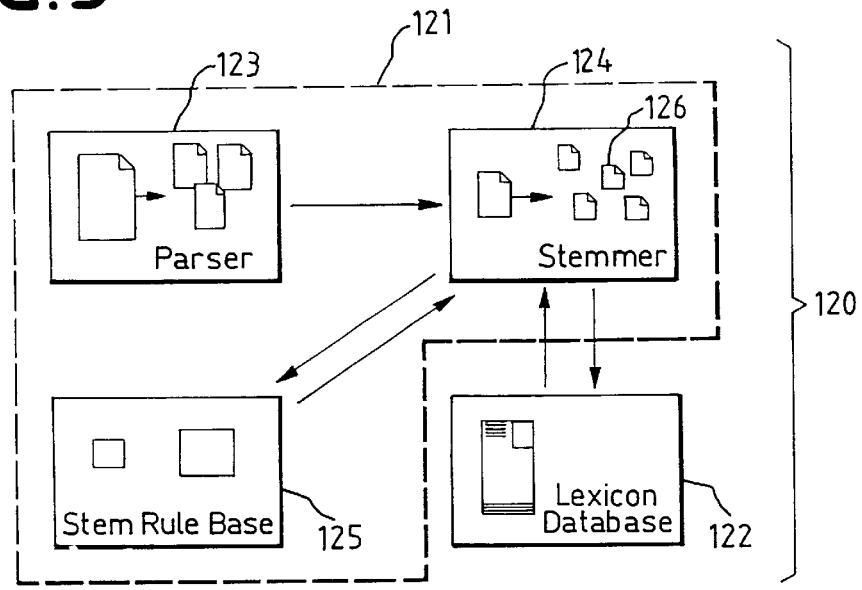
FIG. 3 shows an example of the lexicon component according to the present invention.

Referring to FIG. 3, according to one embodiment of the present invention, the lexicon component 120 consists of two parts: the lexicon generator 121, and the lexical database 122. The lexicon generator 121, which consists of a parser 123, a stemmer 124, and a stemmer rule base 125, may operate on the documents of the database 110 and on the query document 10 to generate the lexical database 122. The lexicon generator 121 parses a document into a list of single words using the parser 123.

After parsing a document, the lexicon generator 121 reduces single words into word stems 126 using the stemmer 124. Word stems 126 are partial word forms derived from single words of the document. The word stemmer 124 uses heuristic rules from the stemmer rule base 125 to reduce inflected or concatenated words to their word stems 126. The word stems 126 derived from the documents 111 of the database 110 are integrated into the lexical database 122.

According to one embodiment of the invention, to facilitate processing of the words from the documents 111, the list of single words may be sorted alphabetically. Since the word list is sorted, the first word of a group of similar words will be the shortest, where similar words are words that have the same word stem 126 but may have different endings, for example, "recognize" and "recognizable" can produce the word stem "recogniz." The invention is flexible and allows alternate rules for deriving word stems. According to an alternate embodiment, for example, the words "recognize" and "recognizable" could produce the word stem "recognize."

Similarity rules help determine whether two words are similar and may be used to establish a word stem. For example, if the word is "read," according to the similarity rules, the words "reads," "reader" and "reading" may be detected to bear the same word stem "read." In discussing similarity rules, consider the concepts of minimal word length and similarity threshold, which may be varied for different embodiments to effect the performance of the search machine 100. The minimal word length refers to a minimum number of letters used in various comparative tasks. The similarity threshold refers to a threshold number of letters that may be different, but yet the words may be considered similar. Some exemplary similarity rules that can be used include, among others:

1. A word must have a minimal word length (e.g. four letters) to be a candidate for similarity matching. For words with length less than the minimal word length (e.g. three letters or less), the words must match completely to be considered similar. For example, according to the example of using a minimal word length of four, three letter words may be entered directly into the lexical database as a stem word.
2. If two words are of equal length, have matching letters for at least the minimal word length, and the number of non-matching letters at the end of the words do not exceed the similarity threshold, then the word without the non-equal part is the word stem.
3. Words that have the same letters for at least the minimal word length, and have a difference in length of not more than the similarity threshold (e.g., three), are considered similar. The shorter word is taken to be the word stem.
4. Words that have the same letters for at least the minimal word length, and have a difference in length of not more than a similarity threshold are considered similar. The portion of the words that have matching letters is taken to be the word stem.

Note that rules 3 and 4 are similar. Under some circumstances they would provide the same result when determining word stems, but under other circumstances, they would provide a slightly different result. For example, rules 3 and 4 would provide the same word stem when processing the words "read" and "reading." If the minimal word length for similarity matching is four, then "read" is a potential word stem. If the similarity threshold is three, then "reading" is similar to "read" because it matches the word stem and has three distinct letters at the end (which is not more than the similarity threshold). According to both rules 3 and 4, "read" is the word stem for "read" and "reading."

Rules 3 and 4, however, would provide a different result if processing "recognize" and "recognizing." According to rule 3, "recognize" would be the word stem. According to rule 4, "recogniz" would be the word stem. Thus, rules 3 and 4 provide two different ways to determine word stems and thus represent a design choice in constructing the search machine. It may be possible, for example, to provide a means of allowing a user to choose between the two similarity matching rules based upon the users preference.

According to the above exemplary embodiment, the lexicon generator 121 may not always find grammatically correct word stems 126. It does, however, find words with the same or similar lexical meaning. Consider, for example, the words "voluntarism" and "voluntary." According to the rule 4 above (using a minimal word length of four and a similarity threshold of three) "voluntar" will be the word stem of both "voluntarism" and "voluntary." Though this may not be correct in a grammatical sense ("voluntar" is not a grammatical root word) it is helpful in establishing a similarity between the two words.

The lexicon generator 121 is useful because it may be used to generate a lexical database 122 of all word stems in the document database 110 without the need for a grammatical model of the underlying natural language. It is sufficient according to the present invention if it contains tractable and consistent hypotheses leading to the word stems 126 for the words contained in the documents of the database 110. The described method of stemming may be used for Indo-European languages without significant adaptation and can be used for other languages as well. The invention can also be applied to languages that are based on character, sign, or symbol representation, such as the Japanese or Chinese languages. If necessary, characteristics of these various languages, such as the different composition of words with respect to the word stem, may be taken into account.

Even if the heuristic rules of the stemmer rule base 125 fail in some special cases, the resulting lexical database 122 should be sufficient for the searching method according to the present invention. Best results should be obtained if the heuristic rules of the stemmer rule base 125 are used consistently. For example, it may be beneficial to apply the same or a similar stemmer rule base 125 to a given query document 10 and to the documents of the database 110 in order to obtain consistent results when comparing query documents 10 to the lexical database 122.

According to the above exemplary stemmer rules, words with the same beginnings but having different endings may be reduced to a common word stem 126 which can be added to the lexical database 122. The search machine may optionally include rules to match words having different prefixes. Thus, for example, consider that the word "mobile" is in the lexical database and the word "immobile" is being processed. "Immobile" can be found similar to "mobile" in the following way:

1. A word in a user query which is not found in the lexicon is decomposed into all substrings equal to or greater than the minimal word length. Assuming a minimal matching length of four, "immobile" produces the strings "immo," "immob," "immobi," "immobil," "mmob," "mmobi," "mmobil," "mmobile," "mobi," "mobil," "mobile" "obil," "obile," and "bile."

2. All of these substrings are compared with entries in the lexicon. Preferably the longest substring is matched. Therefore, one method of finding a match is to start with the substring of the longest length followed by decreasing lengths until a match is found. Since the substring "mobile" is an entry in the lexicon, the original word "immobile" given in the user query is associated with the lexicon entry "mobile."

3. Documents containing the word "immobile" are not as highly ranked as those containing "mobile," but they are considered better than documents which do not contain any such associations.

The rules for stemming words into their word stems 126 are provided by the stemmer rule base 125. Word stems 126 from the words of all documents 111 of the database are collected in the lexical database 122. Words from the documents 111 are looked up in the lexical database 122 by stemming the word using the stemmer rule base 125 and then searching for the word stem 126 in the lexical database 122. Each word stem 126 is assigned a unique index in the lexical database 122. The word stem 126, the word stem's unique index and other information, such as the number of times the word stem 126 appeared in each document 111 may be stored in the lexical database 122.

For example, consider a document 111 that is given the identification number 50 which contains the words "read," "reading," "reads," and "reader." All these words can be associated with the word stem "read" by using the above exemplary stemmer rules. Thus, a lexicon entry that identifies the word stem 126, the document 111 (having hypothetical identification number 50), and the number of occurrences for the word stem 126 could be:

read 50 4

In addition to information indicating the number of occurrences of a word stem 126, each word stem 126 may also be assigned a significance value. A significance value can be based on a word's distinctive identification power within documents or some other criteria. For example, an article such as "the" or "a" does not have significant identification power for showing which documents could be relevant to a query. In contrast, however, a word like "President" has identification power. One way of determining the significance value of a word may be related to the number of documents in which the word stem 126 actually occurred. Each word stem 126 may be provided with a unique significance value. The significance value may be used, for example, as a multiplier in the evaluation process to be discussed below. For example, when a word is found in a database document 111, its occurrence can be emphasized using as a multiplier the significance value assigned to the word in the lexical database.

Significance values may be set, for example, by using information obtained by processing the documents 111 of the database 110. For example, after all the documents 111 have been parsed and the word stems 126 contained in the documents 111 have been found, the number of documents 111 in which a certain word stem 126 occurs may be determined. Also, the number of times a word stem 126 occurs in a certain document 111 may be determined. Such information may be used to calculate the significance values. The more documents 111 in a database 110 that contain a word stem 126, the less the word stem 126 is significant to distinguish documents 111 from each other. For example, if a word stem 126 occurs in all documents 111, the word stem 126 is less significant for distinguishing documents 111. In that case, the word stem 126 could be used to distinguish documents 111, for example, based on the number of occurrences of the word stem 126 in each of the documents 111. The more frequently a word stem 126 occurs within a document 111, the more significant the word stem 126 is for that document 111. For example, if we have a document consisting of 1000 words, a certain word stem 126 which occurs 10 times is more characteristic and significant to that document 111 than if it only occurs 3 times.

An exemplary formula for calculating the significance values for word stems 126 in a database 110 is:

significance value=(logarithm of the number of all documents 111 in the database 110)-(logarithm of the number of documents 111 in which the word stem 126 occurs).

This significance value may be referred to as a global significance value, because it is based on the totality of documents 111 in the database 110.

In addition to this global significance value, a specific significance value which provides an indication of how significant a word stem 126 is for a specific document 111 is:

specific significance value=(number of occurrences of a word stem 126 in the document 111)/(total number of words contained in the document 111).

The specific significance value calculation may be referred to as an inverse document frequency of a term. One unique feature of the calculation is that it is based on the occurrence of the word stems 126 rather than on the words themselves.

An alternative embodiment is to build a grammatically correct lexical database. Such an approach would require a large body of linguistic knowledge as well as significant human and computer resources, which may be avoided using the approach of the embodiment discussed above.

The lexical database 122 consists primarily of the word stems 126 that were generated by the lexicon generator 121. For example, the lexical database 122 may be an alphabetically ordered list of word stems 126. The index for a given lexical entry or word stem 126 may be retrieved from the lexical database 122. To locate a word in the lexical database 122, the word is reduced to its word stem 126 using the word stemmer 124. For consistency in the retrieval process, it is advantageous to use the same stemmer rule base 125 to derive word stems 126 for the documents of the database 110 as well as for the query document 10. The lexical database 122 is searched for the word stem 126. When the word stem 126 is located in the lexical database 122, the corresponding position, or index, is returned as the result of the retrieval process.

Figure 4:
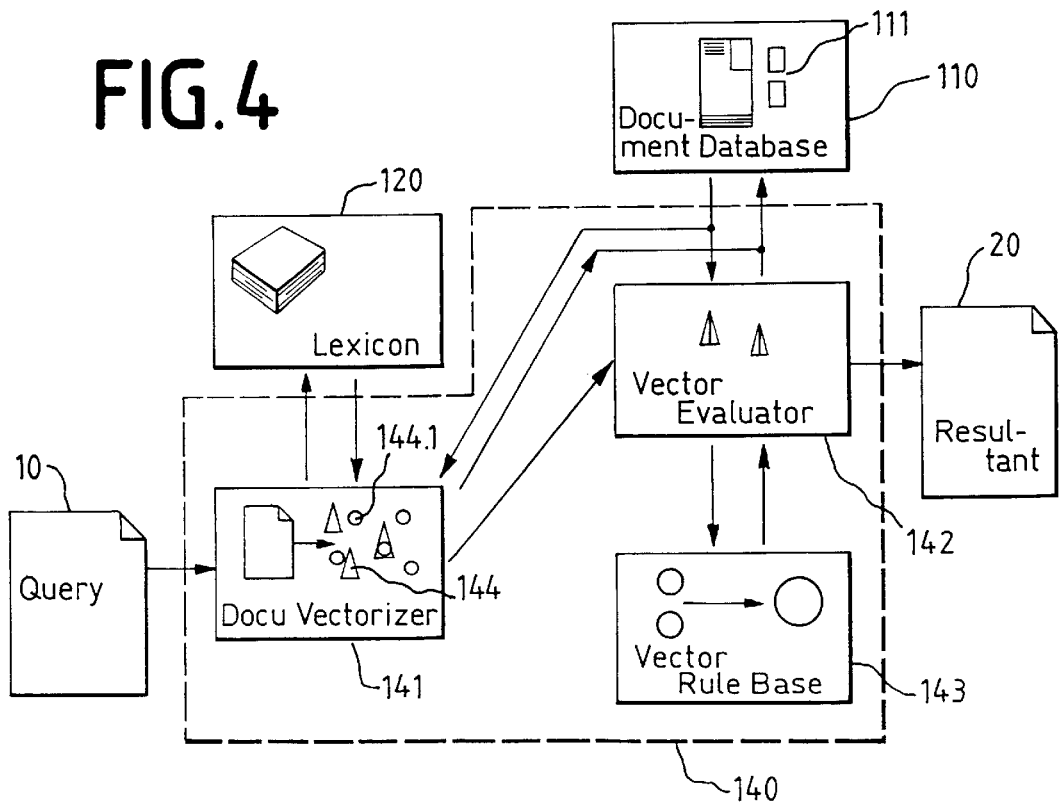
FIG. 4 shows an example of the evaluation component according to the present invention.

The evaluation or comparison aspect of the invention, as shown in FIG. 4, involves an evaluation component 140 that compares documents 111 of the database 110 with the query document 10. The evaluation component determines how well the document 111 will serve as an answer to the user query 10. The determination of relevance is not limited to key word matching or boolean operations, but rather can take into account the whole content of documents or complex parts of a document. The evaluation component 140, however, does not have to compare documents of the database 110 in their natural language form but rather, may compare the representation vectors 144 of the documents.

The evaluation component 140 consists of a document vectorizer 141 and vector evaluator 142. As discussed more fully below, the document vectorizer 141 provides a means for vectorizing documents. One method of vectorizing includes, for example, encoding a document into a representation vector 144 using information from the lexicon component 120. The vector evaluator 142 determines the relevance of a database document 110 with respect to the query document 10 by evaluating the representation vectors 144 of the respective documents. Based on rules from the vector rule base 143, the vector evaluator 142 evaluates each document in the database 110 relative to the other documents in the database 110 depending upon how the representation vectors 144 compare to the representation vector 144.1 of the query document 10 (also referred to as the query representation vector 144.1). The result of the comparison may be, for example, a list of some or all of the documents of the database 110 ranked according to how well they meet the criteria of the query 10. The result list is referred to as the resultant 20.

According to one embodiment, the document vectorizer 141 creates the representation vectors 144 of each document in an n-dimensional space, where n is the total number of word stems 126 in the lexical database 122. The lexical database 122, which may be, for example, an alphabetically sorted list of word stems 126, maintains a unique index for every word stem 126. The lexical database 122, according to one embodiment of the present invention, contains all word stems 126 from each document of the database 110 as well as from the query document 10.

The document vectorizer 141 generates a representation vector 144 of a document by first generating an n-dimensional vector with each element initialized to zero. The document (whether from the database 110 or the query document 10) is processed, deriving the word stem 126 for each word in the document and retrieving the index of the word stem 126 from the lexical database 122. Some words or word groups may be deemed inappropriate for indexing, for example articles or words such as "the," "for," "in," and the like. This may be determined a priori and can be programmed into the stemming rules.

Each time the index of a word stem 126 is retrieved, the element of the n-dimensional vector for that index is incremented. Thus, after the document has been processed, the elements of the representation vector 144 of the document contain information about which word stems 126 occurred in the document and how often they occurred. For example, if the lexical database 122 includes, among others, the word stems "pen" at index 15, "pencil" at index 16, "staple" at index 30, and "tree" at index 55, then a document that contains 5 occurrences of the word "pen," 6 occurrences of the word "pencil," 2 occurrences of the word "staple," and zero occurrences of the word "tree" would have a representation vector with the 15th element having the value 5 (number of occurrences of "pen"), the 16th element having the value 6 (number of occurrences of "pencil"), the 30th element having the value 2 (number of occurrences of "staple"), and the 55th element having the value zero (number of occurrences of "tree").

In an alternative embodiment, rather than creating a representation vector 144 for each document that begins as an n-dimensional null-initialized vector, the representation vector 144 may be a linked list that is dynamically created. A linked list structure may be desirable if, for example, the lexical database 122 contains a large number of word stems (i.e. the number of elements, n, is large) but the size of the documents 111 comprising the database tend to be relatively small. In such a case, there may be a large number of word stems 126 in the lexical database 122 that do not appear in a particular database document 111. Thus, there would be a large number of elements of the representation vector 144 that contain zero. By using a linked list structure, the representation vector 144 could contain only data on stem words 126 actually contained in the document. For example, a stem word 126 is derived from the document 111 and its corresponding index is retrieved from the lexical database 122. The representation vector 144 stores the index and a coun??ter for the number of times that the stem word 126 is found in the document 111. That index and counter pair is linked directly to the next index and counter pair for which the indexed word stem 126 appears in the document 111.

The representation vectors 144 of the documents of the database 110 are compared to the representation vector 144.1 of the query document 10. The comparison can result, for example, in the determination of a relevance value for each document. Providing a relevance value is practical in that it provides convenient information that can be used in a later stage for ranking the results.

There are a number of well-known and widely used functions which can provide an evaluation, such as, the cosine measure function, the dice function, or the jacquard function. These known functions perform vector operations, and therefore can be used to evaluate the representation vectors, which are vector representations of the documents 111. For example, if the vectors 144 have n vector components, they point to certain positions in an n-dimensional space. The cosine measure function calculates the cosine of the angle of the two document representation vectors within the n-dimensional space. If the cosine equals one, the documents are identical. The closer the cosine value is to one, the more similar the documents are. The dice function and jacquard function, as known in the art, also calculate a scalar product of two vector representations, and may thus be used to determine how similar two vector representations are to one another.

These methods, however, typically use only the values in the representation vectors 144 of the documents to perform their evaluations, but not other information that can be used to compare the representation vectors 144. According to the present invention, the documents may be compared on a much more fine-grained level. For example, the evaluation component 140 uses relationships between corresponding vector elements of the vectors being compared to account for special circumstances between two vector representations. A number of special cases may be used to establish different contributions to the relevance value. For example, the following relationships may be used to determine relevance values for documents (this is not an exhaustive list and other relationships will be obvious to those of skill in the art):

(i) a word stem does not occur in the query document and also does not occur in a database document;

(ii) a word stem does not occur in the query document but does occur in the database document;

(iii) a word stem occurs less frequently in the query document than in the database document;

(iv) a word stem occurs in the query document and equally as often occurs in the database document;

(v) a word stem occurs more frequently in the query document than in the database document;

(vi) a word stem occurs in the query document but does not occur in the database document.

The vector evaluator 142 can use relationships such as these to establish rules in the vector rule base 143. If the condition or relationship is met, then a relevance value of the document 111 can be adjusted according to the rule's consequence or the rule's output. The consequence of the rules, or the degree that the relevance value is adjusted by a rule, may be determined empirically. For example, if a word stem 126 occurs frequently in both the query document 10 and the database document 110, then the relevance value assigned to that database document 110 could be increased by some specified amount. However, if a word stem occurs frequently in the query document but only occasionally in the database document 110, then the relevance value will be increased by some smaller amount, because this shows less correspondence between the documents. Further, if a word stem appears frequently in the query document but never appears in the database document, then the relevance value could be decreased by some amount.

During the evaluation process, each document may be assigned a value based on how relevant the document is with respect to the query. When a condition of a rule is met, then the relevance value associated with that document may be adjusted. After all vector elements are compared, the resulting value of the comparison may be used as a measure of how relevant the document 111 is to the query document 10.

Alternatively, or in combination therewith, significance values may be assigned to individual words within the document, as a step in determining the relevance of the document as a whole. A rule is used to provide some quantifiable value to a condition. If a condition is met by a specific word, then a numerical value may be assigned to that word in that document. Then, for example, if the word occurs numerous times, and it has a high relevance value, or, for example, it is a word with inherently high identification power, then it will have a greater effect in assigning an overall relevance value to the document as a whole.

The known approaches mentioned above (e.g. dice, jacquard and cosine measure functions) cannot distinguish special conditions or relationships such as those described above when comparing vector elements. The ability of the present invention to differentiate at this level is important in two respects. First, the evaluation component 140 according to the present invention is more flexible and can be more precise in its evaluation by distinguishing in subtle ways using various relationships or rules such as those described above. Second, the evaluation component 140 has more parameters to use in the fine-tuner 130 for adapting user-specific preferences into the search criteria.

The evaluation process includes the steps of having every document from the database 110 compared to the query document 10 and assigned a relevance value according to the vector rule base 143. The resultant 20 of this evaluation process may be a ranked result list, or some other form of information about the documents 111 that reflects the search result. The resultant 20 may contain, for example, document names or some other document identification, in order according to the relevance values determined for each document in the database 110. Such a list may be presented to the user, or used to display interactively the actual text of the documents that were ranked in the search.

The vector evaluator 142 and its application of the vector rule base 143 in determining a documents relevance to the query document 10 may be applied not only to whole documents but also to parts of documents. For example, a paragraph of a document of the database 110 can be represented by the described vector method. This representation vector 144 of part of a document of the database 110 can be compared to the representation vector 144.1 of the query document 10 (or a part of the query document 10). Thus, the evaluation may be performed on two levels: first, a determination of the most relevant document (or the best n documents), and second, a determination of the most relevant part of a document or documents. It is thereby possible to guide the user to specific subsections of a document that meet the user's search criteria.

The search machine 100 may incorporate special parsers 123 that recognize certain types of documents which may have structures and markers, such as, for example, html or latex. Thus, the search machine 100 may utilize the text structure more efficiently. In this way, not only paragraphs but sections, subsections or other divisions and markers in the text can be used to divide the document into evaluatable sections.

Referring back to FIG. 1, as discussed above the present invention may also provide a fine tuner 130. A fine tuner 130 allows the user to fine-tune the search machine 100 in order to affect the resultant 20 of the search. For example, if the resultant 20 is a ranked list of the documents 111, the user may review the ranked list and give feedback about the quality of the results. For example, the user may rear-range the result list according to the user's preferences and provide the rearranged list as user feedback 30 to the search machine 100. Using the user feedback 30, the fine-tuner 130 modifies the rules of the vector rule base 143 so that the ranked list of the resultant 20 is ranked the same as or similarly to the user feed-back 30.

Figure 5:
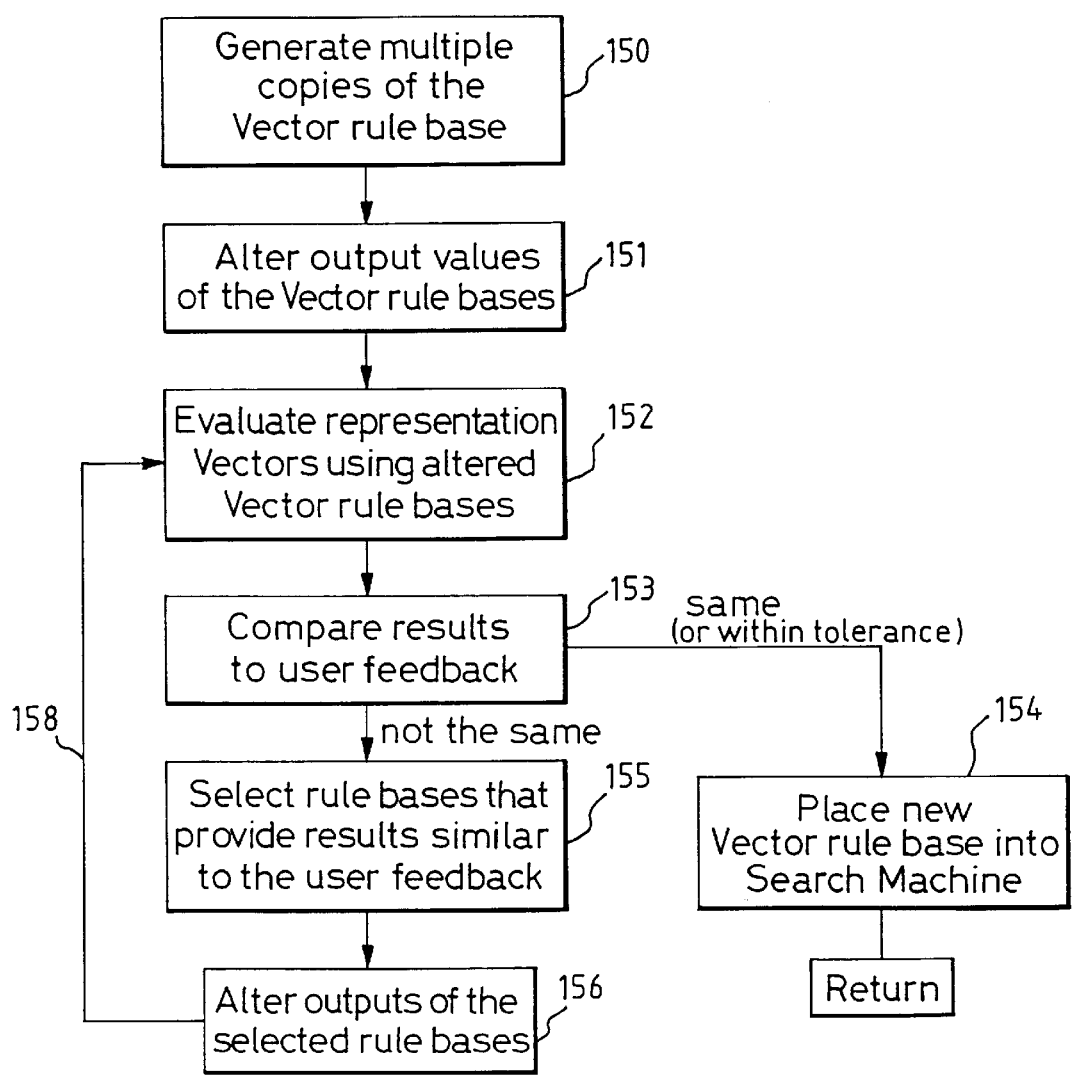
FIG. 5 shows a flow chart of an evolutionary algorithm for the fine tuner according to the present invention.

The fine-tuner 130 may use an evolutionary algorithm to modify the rules of the vector rule base 143. An evolutionary algorithm provides for the adaptation of the rules used by the evaluation component 140 as a complex stochastic search problem. For example, a user may provide feedback 30 by re-ranking the output documents such that a document that contains certain occurrences of one word stem but does not contain any occurrences of a second word stem is given higher relevance than a document that contains some occurrences of both word stems. The evolutionary algorithm may recognize such a factor and adjust the vector rule base 143 such that the ranked output is the same as the user feedback 30. An exemplary evolutionary algorithm is shown in a flow chart in FIG. 5. Consider a process in which a user has specified a query 10, the search machine 100 has compared the documents 111 with the query 10 based on a certain vector rule base 143 and produced a ranked list as resultant 20. The user has provided a re-ranked list as feedback 30. An evolutionary algorithm for modifying the vector rule base 143 in order to produce a resultant 20 the same as the feedback may include the following steps:

| | |
|---|---|
| Step 1 (box 150): | Generate multiple vector rule bases identical to the initial vector rule base. A complete vector rule base 143 may be referred to as an "individual." An individual may be, for example, an ordered set of the output values of all rules. |
| Step 2 (box 151): | Randomly alter output values in each individual to create new individuals. |
| Step 3 (box 152): | Use the new individuals in the vector evaluator 142. |
| Step 4 (box 153): | Compare the outputted document list of each new individual to the user feedback 30. |
| Step 5 (box 154): | If the outputted document list of a new individual leads to the desired list, terminate the process and select that individual as the new rule set for the evaluator. Otherwise proceed with step 6. |
| Step 6 (box 155): | Select the individuals that led to document lists similar |

| | |
|---|---|
| Step 7 (box 156): | to the user feedback 30, and discard the other individuals. Create new individuals from the individuals selected in step 6. For example, the following approaches, among others, could be used: |
| Option 1: | Create new individuals by randomly combining rules of the individuals selected in step 6. |
| Option 2: | Randomly alter some output values of the individuals selected in step 6. |
| Step 8 (arrow 157): | Go back to step 3. By implementing such an evolutionary algorithm, the search machine allows the user to provide feedback 30 which the search machine can use to modify the vector evaluation criteria so that the users preferences in output may be more readily achieved by the search machine. |

The search machine 100 may be implemented on a computer system 160 as shown in FIG. 6. A central processing unit 161 controls the search machine process which includes performing routines that may be loading into addressable memory 162 of the computer 160. The computer 160 also includes working memory 163 and may be connected to a network 164 and some form of database or mass storage 165 as is known in the art. The computer 160 includes a display or other output device 166 for providing results to the user, and a keyboard or some other input device 167 for obtaining instruction and feedback from the user. The routines include those for performing the operations described above for searching database documents according to a query input by a user.

While the invention is discussed in terms of the search machine 100 and its components, including without limitation, the lexicon component 120, the evaluation component 140 and the fine tuner 130, it should be understood that the search machine 100 may be implemented on a single machine as a bundled product where the functionality is not discretely distributed to separate components. Alternatively, the functionality of each component may be distributed across multiple pieces of hardware, with various components and sub-components maintained separate from each other. The search machine could likewise be a combination of implementations in discrete hardware and software components and combinations thereof as convenient for the implementation of the various functional aspects of the invention.

The invention is not limited to the specific embodiments disclosed herein but is intended to cover other embodiments that come within the spirit and scope of the claims. For example, the various components and subcomponents discussed may be implemented into a single module, or may be even further divided into distinct subparts, with each subpart being created separate from the other subparts. The functionality may be performed by differently labeled components without violating the spirit of the invention. For example, according to one embodiment of the invention, the lexicon generator 121 parses and stems the documents 111. The vectorizer 141 (a component of the evaluation component 140) vectorizes the documents 111. It is within the scope of the invention, for example, to have a functional component that parses, stems and vectorizes the documents 111, rather than having these steps performed by distinct components.

What is claimed is:

1. A search machine for retrieving information from documents of a database based on a query of a user, the search machine comprising:

a lexicon generator for deriving a lexicon database of word stems from the database and from the query; and an evaluation component, the evaluation component including a document vectorizer for creating document representation vectors for respective documents of the database and a query representation vector for the query using the lexicon database, the document representation vectors containing data on the word stems located in the respective documents and the query representation vector containing data on the word stems located in the query, the evaluation component further including a vector rule base, and a vector evaluator, the vector evaluator comparing the document representation vectors to the query representation vector based on the vector rule base, wherein the evaluation component generates the information from the database based on the query; and a fine-tuner, the fine-tuner modifying the vector rule base based on external feedback from the user, the feedback associated with the information generated by the evaluation component.

2. The search machine of claim 1, wherein the information generated by the evaluation component of the search machine is a list of at least some of the documents ranked according to the documents, relevance to the query document.

3. The search machine of claim 1, wherein the lexicon database of word stems includes an index corresponding to each of the word stems, and the document representation vectors comprise at least a counter for each index of each of the word stems, a value of the counter representing the number of occurrences within the respective documents of the database of the word stem corresponding to the index.

4. The search machine of claim 1, wherein the lexicon database of word stems includes an index corresponding to each of the word stems, and the query representation vector comprises at least a counter for each index of each of the word stems, a value of the counter representing the number of occurrences within the query of the word stem corresponding to the index.

5. The search machine of claim 1, wherein the vector evaluator compares the document representation vectors to the query representation vector by assigning a relevance value to the document representation vector based on conditions specified in the vector rule base.

6. The search machine of claim 1, wherein the vector rule base includes rules that compare the database documents to the query based in part on whether any or all or a combination of conditions are met, the conditions including at least one of the following:

(i) a word stem does not occur in the query and also does not occur in a database document;

(ii) a word stem does not occur in the query but does occur in the database document;

(iii) a word stem occurs less frequently in the query than in the database document;

(iv) a word stem occurs in the query and equally as often occurs in the database document;

(v) a word stem occurs more frequently in the query than in the database document; and (vi) a word stem occurs in the query but does not occur in the database document.

7. The search machine of claim 1, wherein the lexicon database includes word stem frequency data related to a frequency of occurrence of the word stem in the documents of the database.

8. The search machine of claim 1, wherein the lexicon database includes a significance value corresponding to each word stem.

9. The search machine of claim 1, wherein the feedback comprises a user ranked list of documents.

10. The search machine of claim 1, wherein the vector rule base contains at least one condition that provides an output value based on whether the at least one condition is met by a document representation vector, and wherein the fine-tuner modifies the vector rule base by randomly changing the output value of the at least one condition.

11. A method of retrieving documents from a database corresponding to a query document, the method including the steps of:

deriving a lexical database of word stems from each document of the database and the query document;

creating a document representation vector corresponding to each document of the database and a query representation vector for the query document, each document representation vector containing information about the word stems of the lexical database that are contained in the document to which the document representation vector corresponds, the query representation vector containing information about the word stems that are contained in the query document;

evaluating each document representation vector relative to the query representation vector with vector evaluation rules;

creating output reflecting the evaluation of the document representation vectors;

displaying the output;

receiving feedback that specifies preferences for the output; and modifying the vector evaluation rules based on the feedback such that the output more closely reflects the preferences provided in the feedback.

12. The method of claim 11, wherein the step of creating the document representation vector corresponding to each document of the database includes the steps of:

generating an n-dimensional representation vector with each element of the representation vector initialized to zero, where n is the number of word stems contained in the lexical database;

deriving the word stem for each word in the document;

retrieving the index of the word stem from the lexical database; and incrementing the element stored at the index of the representation vector each time the index of a word stem is retrieved.

13. The method of claim 11, wherein the step of deriving a lexical database of word stems from each document of the database and the query document includes the steps of:

parsing each document into a list of words;

deriving words stems from the words by matching words that have similar beginning letter sequences but different ending letter sequences; and storing each of the word stems in the lexical database.

14. The method of claim 13, wherein the step of deriving word stems includes the steps of:

setting a minimal word length;

setting a similarity threshold;

determining which words have matching letters for the minimal word length, and have a difference in length of not more than the similarity threshold, and taking the shorter of the words as the word stem.

15. The method of claim 13, wherein the step of deriving word stems includes the steps of:

setting a minimal word length;

setting a similarity threshold;

determining which words have matching letters for the minimal word length, and have a difference in length of not more than the similarity threshold, and taking the matching letters as the word stem.

16. The method of claim 13, wherein the step of deriving word stems includes the steps of:

setting a minimal word length;

setting a similarity threshold;

determining when words of equal length have matching letters for at least the minimal word length, and are non-equal for the last letters equal to or less than the similarity threshold, and taking the word without the non-equal part as the word stem.

17. The method of claim 11, wherein the step of evaluating each document representation vector relative to the query representation vector includes the steps of:

assigning a relevance value to each document representation vector based on whether conditions are met, the conditions including at least one of the following: (i) a word stem does not occur in the query representation vector and also does not occur in the document representation vector; (ii) a word stem does not occur in the query representation vector but does occur in the document representation vector; (iii) a word stem occurs less frequently in the query representation vector than in the document representation vector; (iv) a word stem occurs in the query representation vector and equally as often occurs in the document representation vector; (v) a word stem occurs more frequently in the query representation vector than in the document representation vector; and (vi) a word stem occurs in the query representation vector but does not occur in the document representation vector.

18. The method of claim 11, further including the step of:

assigning a significance value to at least one of the word stems of the lexical database and using the significance value to influence the evaluation of document representation vectors that contain the at least one word stem.

19. A search machine for retrieving information from documents of a database based on a query of a user, the search machine comprising:

means for generating a lexical database, the lexical database comprising word stems of the documents and of the query; and means for evaluating the documents relative to the query, the means for evaluating including a vectorizing means for creating document representation vectors for the documents of the database and a query representation vector for the query using the lexicon database, the document representation vectors containing data on the word stems located in the documents and the query representation vector containing data on the word stems located in the query, the means for evaluating further including a vector rule base, and means for comparing vectors that compares the data on the word stems using rules from the vector rule base, wherein the means for evaluating the documents provides a resultant comprising at least some of the documents from the database ranked according to the documents relation to the query; and means for modifying the vector rule base based on external feedback from the user, the feedback including a modified resultant.

20. The search machine of claim 19 wherein the means for generating a lexical database further includes a means for parsing the documents into a list of words, and means for deriving word stems from the list of words by matching a specified number of letters in the words from the list of words with other words from the list of words, yet allowing other letters from the words to not match.

21. The search machine of claim 19, wherein the modified resultant includes a user-ranked resultant.

22. A computer-readable medium having stored thereupon a plurality of instructions, the plurality of instructions including instructions which, when executed by a processor, cause the processor to perform the steps of:

deriving a lexical database of word stems from documents of a database and from a query document;

creating a representation vector corresponding to each of the documents of the database where each representation vector contains information about the word stems of the lexical database that are contained in the document of the database to which the representation vector corresponds;

creating a query representation vector corresponding to the query document, where the query representation vector contains information about the word stems that are contained in the query document;

evaluating each representation vector relative to the query representation vector with vector evaluation rules to form an evaluation of the representation vectors;

creating output reflecting the evaluation of the representation vectors;

displaying the output;

receiving feedback that specifies preferences for the output; and modifying the vector evaluation rules based on the feedback such that the output more closely reflects the preferences provided in the feedback.

23. The computer-readable medium of claim 22 wherein the step of creating a representation vector corresponding to each document of the database further includes;

generating an n-dimensional representation vector having n elements, each element of the representation vector being initialized to zero, where n is the number of word stems contained in the lexical database;

deriving the word stem f or each word in the document;

retrieving an index corresponding to the word stem from the lexical database;

incrementing the element stored at the index of the representation vector each time the index is retrieved.

* * * * *

UNITED STATES PATENT AND TRADEMARK OFFICE
CERTIFICATE OF CORRECTION

PATENT NO. : 6,741,959 B1
DATED : May 25, 2004
INVENTOR(S) : Matthias Kaiser

It is certified that error appears in the above-identified patent and that said Letters Patent is hereby corrected as shown below:

Title page,
Item [54], Title, "TO" should read -- FOR --.

Column 15,
Line 64, "words stems" should read -- word stems --.

Column 16,
Line 61, "including a vectorizing" should read -- including vectorizing --.

Column 18,
Line 20, "includes;" should read -- includes: --.

Signed and Sealed this

Seventeenth Day of August, 2004

JON W. DUDAS
*Acting Director of the United States Patent and Trademark Office*